Patented Aug. 29, 1933

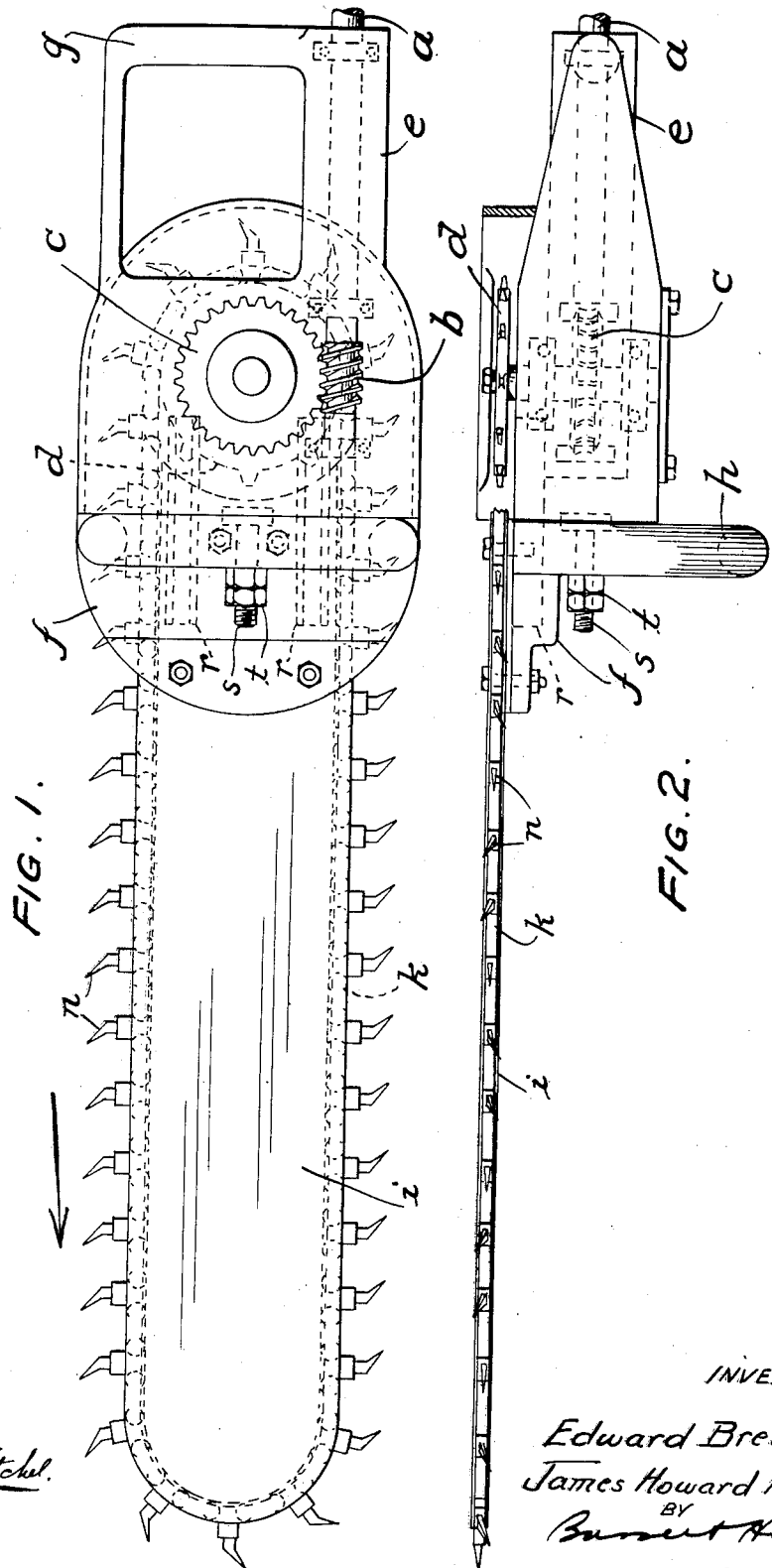

1,924,347

UNITED STATES PATENT OFFICE 1,924,347

MACHINE FOR CUTTING COAL

Edward Breit and James Howard Ford, Leslie, W. Va., assignors to The Berwind-White Coal Mining Company, Windber, Pa., a corporation of Pennsylvania Application February 21, 1931. Serial No. 517,421

2 Claims. (Cl. 262—28)

The object of the invention is to provide a light and cheap machine adapted to be easily manually manipulated to cut deep grooves in a body of coal to form projecting masses of coal, disconnected except for their integral connection with the coal body, which may be subsequently readily detached in the form of large lumps by means of manually operable tools and without the use of explosives. A further object of the invention is to so cut the grooves as to produce a minimum amount of fine coal and dust, which has a much lower commercial value than coal in large lumps.

A preferred embodiment of the invention is shown in the drawings, in which—

Fig. 1 is a plan view, and Fig. 2 a side view, of the machine.

The shaft $a$ is connected, by means of a flexible shaft (not shown) with the shaft of a driving motor (not shown). On the shaft $a$ is a worm $b$ which drives a worm wheel $c$ on a shaft carrying a sprocket wheel $d$.

Secured to the main frame $e$, which carries the above specified shaft, worm, worm-wheel and sprocket wheel, is a supplemental frame $f$. Frame $e$ is so shaped as to provide a hand-hold $g$. Secured to frame $f$ is a handle $h$.

Secured to the frame $f$, and projecting for a substantial distance beyond it, is a long flat chain-supporting or guiding plate $i$ having a semicircular free end. Extending around the edge of this plate $i$ and also around sprocket wheel $d$ is a sprocket chain $k$. Secured to the sprocket chain $k$ are forwardly extending knives or cutters, some of which extend in the plane of the plate $i$ and others of which extend at an oblique angle to plate $i$ toward one side or the other of the plate.

Figure 5:
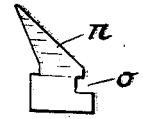
Fig. 5 is a detail side view of one of the cutters.
Figure 6:
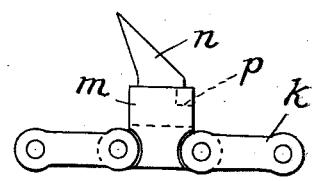
Fig. 6 is a detail side view of a few links of the chain and of a cutter supported thereon.
Figure 7:
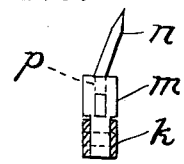
Fig. 7 is an end view, partly in section, of Fig. 6.

In Figs. 5, 6 and 7 are illustrated the preferred construction of cutter and the preferred means of securing a cutter to the chain. Confined within spaced apart links of the chain are the shanks of blocks $m$, which are provided with central recesses into which are inserted the knives $n$. The inserted part of each knife is provided with a recess $o$ into which is inserted a small filler block $p$, which may be welded or otherwise secured in position.

The frame $f$ is provided with dovetail projections $r$ which are slid into dovetail grooves in frame $e$. A bolt $s$ projects from frame $e$ and extends through a solid portion of frame $f$. By means of nuts $t$ on bolt $s$ the frames can be adjusted to maintain the desired tension on the cutter-carrying sprocket chain $k$.

In operation the operator grasps the handles $g$ and $h$ and positions the machine for cutting into the wall of coal. The machine may be first so positioned that the plate $i$ extends horizontally. The motor is started, causing the sprocket chain to move and cut into the coal. As the cutting proceeds the machine is advanced in the longitudinal direction of its extension, causing the cutters to penetrate more deeply into the coal until the sprocket chain has penetrated the coal to a distance nearly or quite equal to the length of the projecting part of plate $i$, as shown in Fig. 4.

Figure 3:
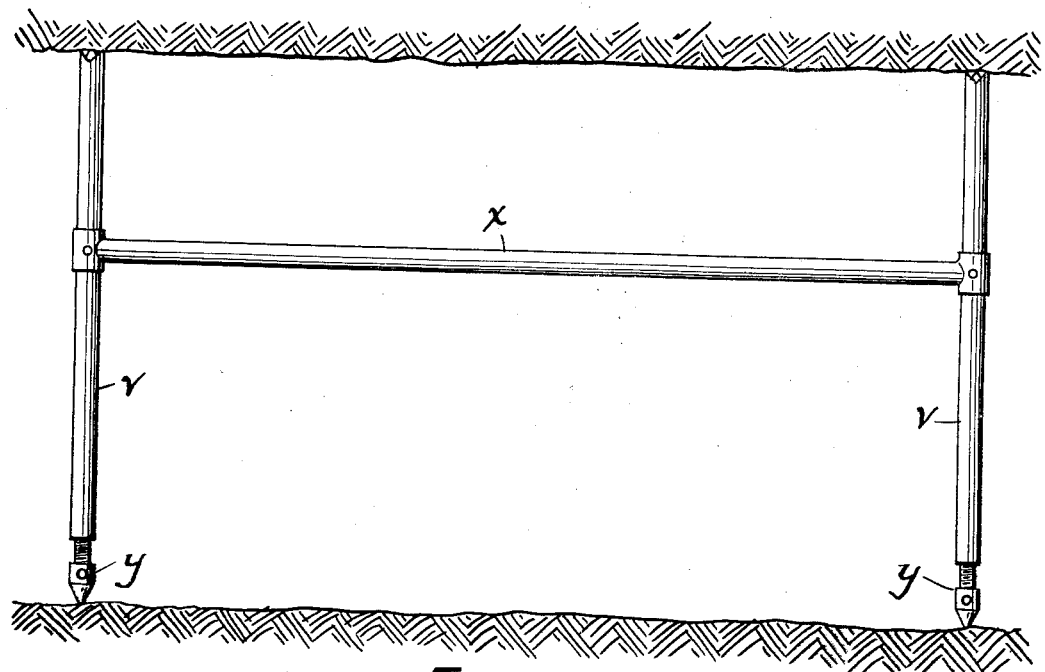
Fig. 3 is an elevation of the means for supporting the machine while in operation.
Figure 4:
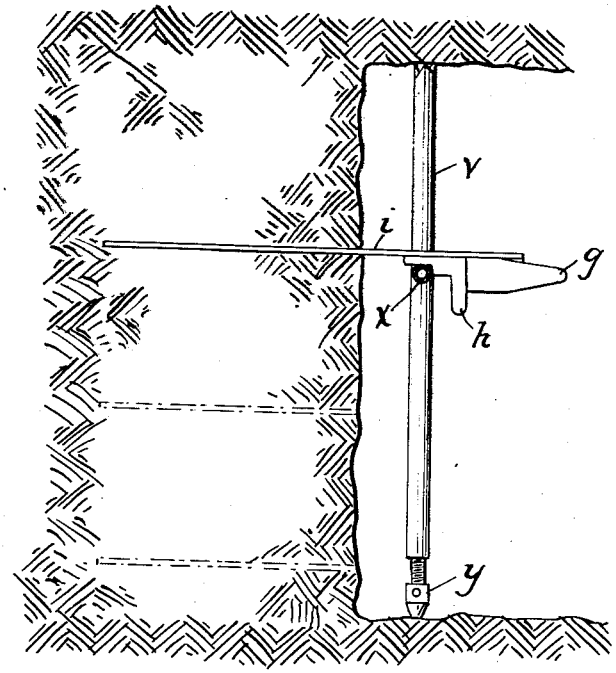
Fig. 4 is an edge view of Fig. 1, showing also the coal bed in section and the machine (in diagram) in cutting engagement with the coal bed.

To facilitate this operation, there first may be erected the frame shown in Figs. 3 and 4, comprising posts $v$ connected by a vertically adjustable cross-bar $x$. The posts have threaded in their lower ends feet $y$ having conical bases which penetrate the floor of the coal chamber. By turning the feet relatively to the posts, the latter may be forced against the roof of the coal chamber, thereby firmly securing the frame in position. Such frames are well known in the art of coal mining. The cross-bar $x$ affords a support and guide for the plate $i$ during the coal-penetrating operation.

After a deep groove has been formed in the coal seam, the cutter may be manually moved laterally to widen the groove to the extent desired.

The machine is then disengaged from the groove which it has cut, the cross-bar $x$ is lowered (or raised) and another similar and parallel groove is cut below (or above) the first groove, the grooves being spaced apart any desired distance.

By turning the machine into a position at right angles to that described (so that plate $i$ extends in a vertical plane), vertical grooves, connecting the horizontal grooves, may be cut in the coal seam, thus leaving a number of projecting blocks spaced apart except for their integral connection at the back with the coal body.

Such blocks may be readily pried loose from the coal body by means of bars or other mechanical contrivances.

The machine has the advantage of being of cheap construction, of being readily manipulable by one man, or by two men each grasping one of the handles, of being rapid in action, and of producing a minimum of coal dust or fine coal, since the width of the cut grooves does not exceed the width of the sprocket chain.

Having now fully described our invention, what we claim and desire to protect by Letters Patent is:

1. A machine for cutting coal comprising a frame in two sections, chain-driving mechanism carried by one section, a chain support carried by and projecting beyond the other section, a chain carried by said support and operatively engaging said driving mechanism, means securing said frame sections together and comprising means to adjust the frame sections relative one to the other in the direction of extension of the chain and its support, and two hand-holds, one on one frame section and the other on the other frame section, one of said hand-holds being at the extreme rear of the machine.

2. A machine for cutting coal in coal beds comprising a thin flat chain support, a chain extending along and around the edge of said support, cutters carried by the chain, a frame carrying said support, chain driving means carried by said frame including a wheel driven by a worm and a flexible shaft driving said worm, and two hand holds, each extending transversely of the axis of the worm and one being at the extreme rear of the machine.

EDWARD BREIT.
JAMES HOWARD FORD.